United States Patent [19]

Cornish et al.

[11] Patent Number: 5,205,656
[45] Date of Patent: Apr. 27, 1993

[54] HOUSED BEARINGS

[75] Inventors: Peter T. Cornish, Gloucestershire; Reginald Williams, Wolverhampton, both of England

[73] Assignee: The Torrington Company, Torrington, Conn.

[21] Appl. No.: 702,051
[22] Filed: May 17, 1991
[51] Int. Cl.⁵ .............................................. F16C 35/04
[52] U.S. Cl. .................... 384/474; 384/489; 384/537
[58] Field of Search ............... 384/542, 474, 537, 585, 384/489, 510

[56] References Cited

U.S. PATENT DOCUMENTS

| | | | |
|---|---|---|---|
| 1,689,856 | 10/1928 | Brown | 384/542 |
| 2,690,937 | 10/1954 | Leister | 384/537 |
| 2,914,364 | 11/1959 | Ross | 384/489 |
| 2,971,211 | 2/1961 | Kramcsak | 384/489 |
| 5,080,501 | 1/1992 | Siebert et al. | 384/537 |

Primary Examiner—Lenard A. Footland
Attorney, Agent, or Firm—John C. Bigler

[57] ABSTRACT

A housing for a ball or roller bearing includes a first annular part and a second annular part which removably mate together to define a volume in which a bearing is housed and held. The two parts are provided with lugs and corresponding mating components so that when the two parts are offered up to one another and turned relatively to one another, the two parts interlock, O-rings being provided to preload the assembly. One of the parts is provided with a grease nipple.

12 Claims, 4 Drawing Sheets

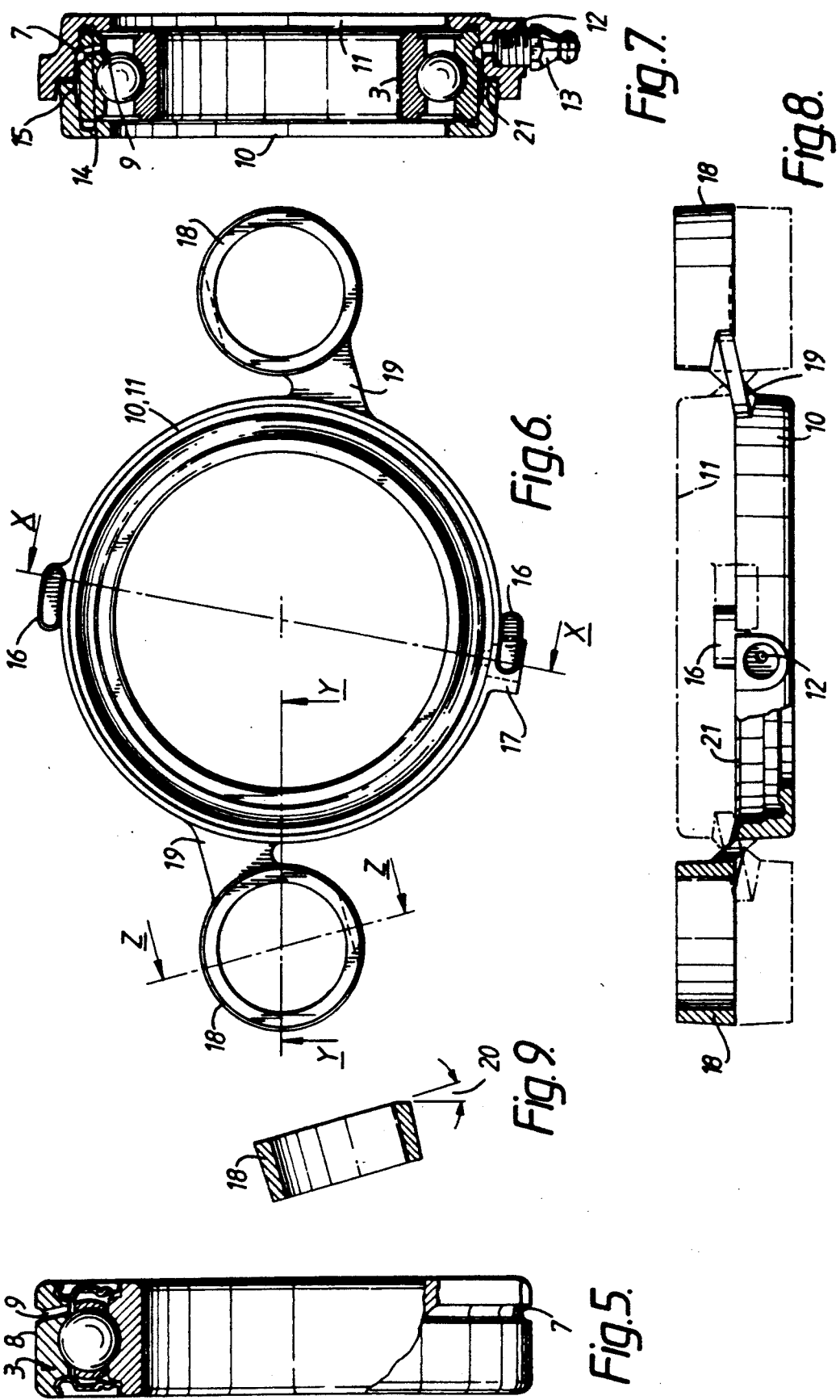

5,205,656

HOUSED BEARINGS

BACKGROUND OF THE INVENTION

This invention relates generally to a bearing having a housing and, more particularly, to a housing for a ball or roller bearing.

In current helicopter designs, as illustrated in FIG. 1, a horizontal driveshaft 1 is supported in a number of places by housed bearings 2.

One such bearing is shown in FIGS. 2 through 4 at reference numeral 3. The bearing is housed within a housing 4 (of a conventional type typically as shown in FIG. 4), and the housing 4 is mounted by rubber bushes 5 in a cradle 6.

The known housing 4 is normally made out of magnesium alloy and is machined for bearing diameter, retaining clip grooves and mounting holes, and it is accordingly desirable to produce a less costly, lighter design.

The foregoing illustrates limitations known to exist in present housed bearings. Thus, it is apparent that it would be advantageous to provide an alternative directed to overcoming one of more of the limitations set forth above. Accordingly, a suitable alternative is provided including features more fully disclosed hereinafter.

SUMMARY OF THE INVENTION

In one aspect of the present invention, this is accomplished by providing a housing for a ball or roller bearing, the housing comprising a first part and a second part which removably mate together to define a volume in which the bearing is housed and held.

The foregoing and other aspects will become apparent from the following detailed description of the invention when considered in conjunction with the accompanying drawing figures.

BRIEF DESCRIPTION OF THE DRAWING FIGURES

FIG. 1 is a schematic view of a helicopter showing a typical drive shaft arrangement;

FIGS. 2, 3, and 4 are respectively a perspective view, a sectional view and an exploded view of a known type of bearing for a drive shaft illustrating how that bearing is mounted in a housing which itself is secured to another component;

FIG. 5 is a sectional view of a bearing of the type intended to be incorporated in the present housing;

FIG. 6 is an end view of a housing according to the present invention;

FIG. 7 is a sectional view of the housing shown in FIG. 6, with the bearing of FIG. 5 housed therein, taken on the line X—X of FIG. 6;

FIG. 8 is a sectional view of the housing taken on the line Y—Y of FIG. 6; and

FIG. 9 is a sectional view taken on the line Z—Z of FIG. 6.

DETAILED DESCRIPTION

Figure 1:
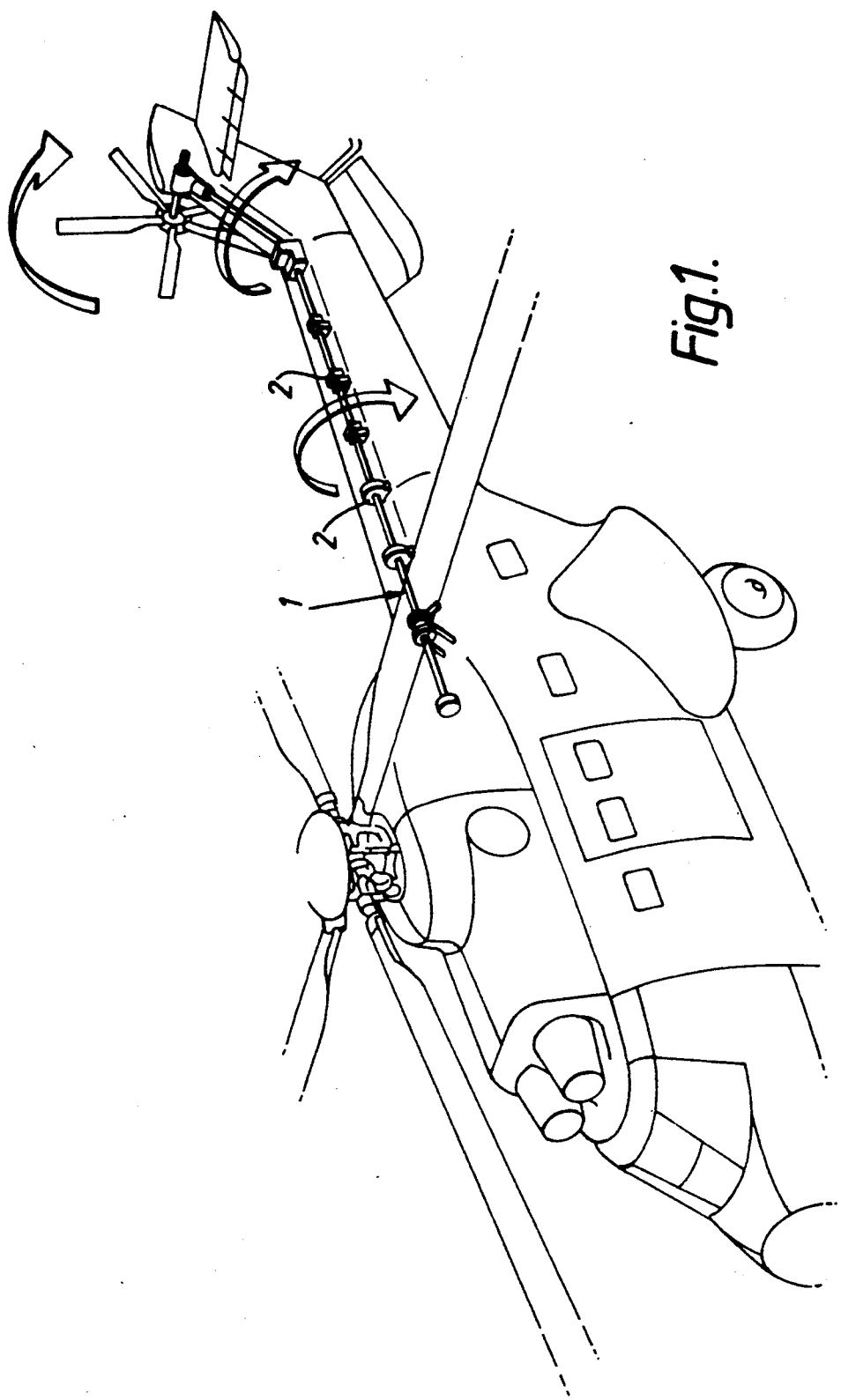
Figure 2:
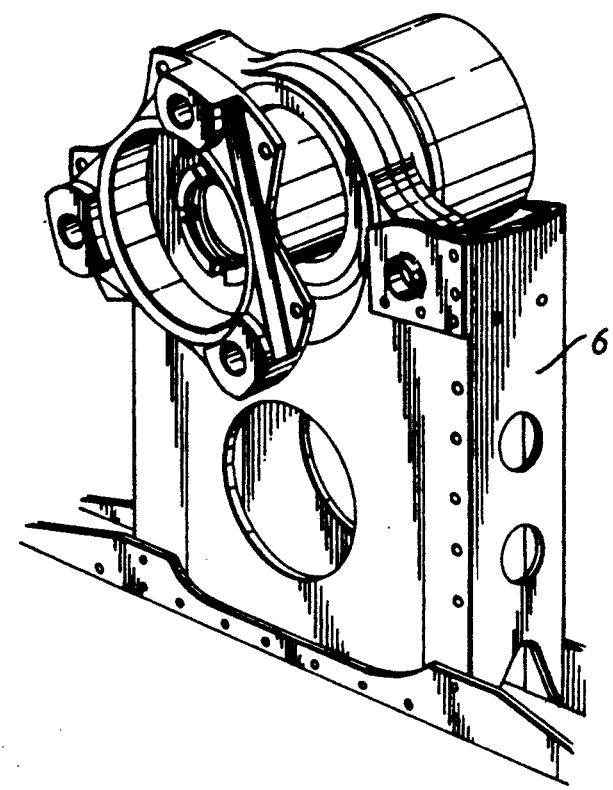
Figure 3:
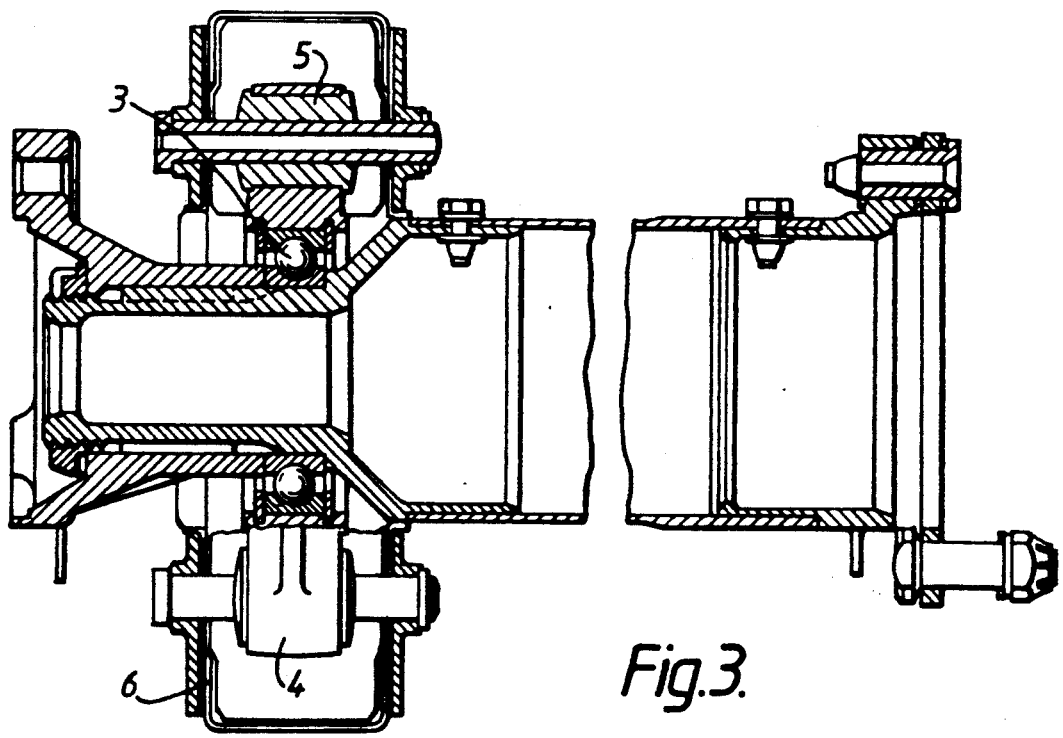
Figure 4:
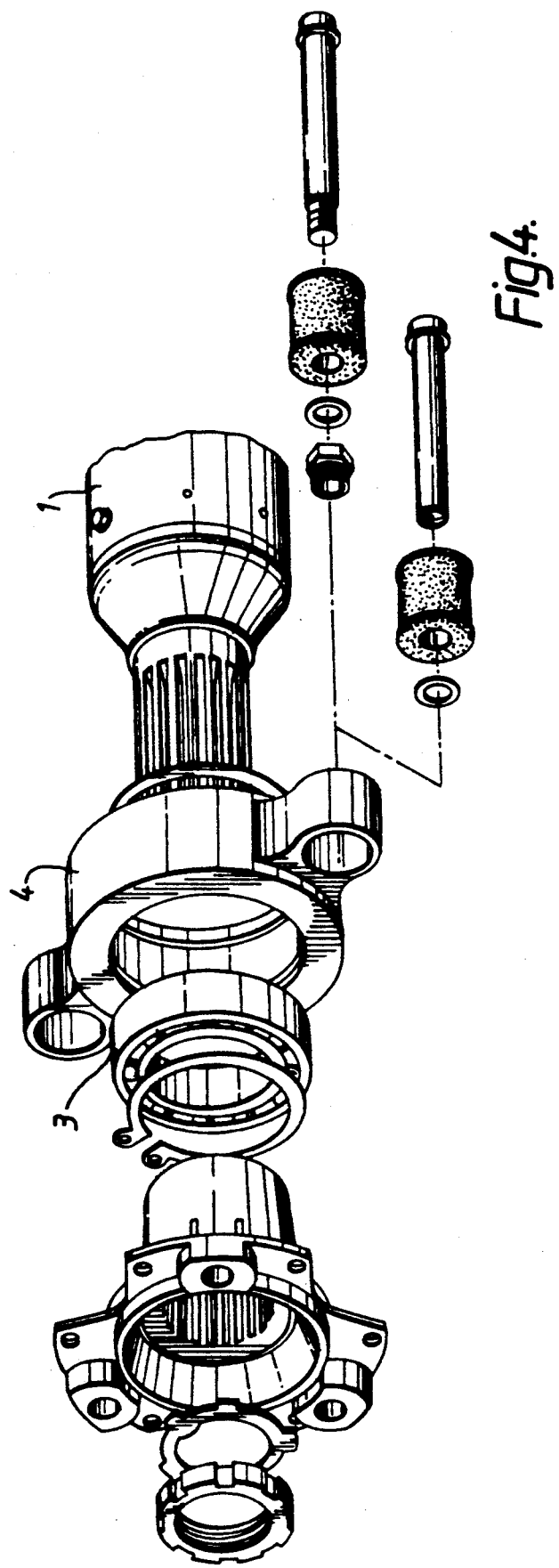

According to the present invention, there is provided a housing for an antifriction bearing in which the housing includes a first part and a second part which removably mate together to define a volume in which the bearing is housed and held.

The two parts may be identical, except for the fact that one of the parts can be provided with a grease nipple hole.

The two parts may be molded. The molding may comprise carbon fiber-reinforced resin.

Each part has a substantially annular main section of basic L-section and each can be provided with cooperating lugs and/or other mating components which, when the two parts are offered to one another and when one of the parts is rotated relatively to the other part, cause the two parts to interlock.

An annular seal can be provided around the bearing and between the bearing and the joint between the two parts of the housing.

An annular seal can be provided between an outer ring of the bearing housed by the housing and one inner lateral face of one of the parts, thereby applying pressure between the contacting faces of the lugs and/or other mating components.

Each of the parts can be provided with a member for mounting the housing on something else.

The invention also extends to a ball or roller bearing housed in a housing according to the invention. The bearing may be one for use in a drive shaft assembly.

The housing according to the present invention is shown in FIGS. 6 through 8 and is intended to be in substitution for the housing 4 shown in the earlier figures. The bearing 3 within the housing is also shown in FIG. 5, and is modified so that it can be regreased, the present housing facilitating this.

The bearing 3 shown in FIG. 5 is provided with a groove 7 around its outer ring 8, and three substantially radially-extending bores 9 are provided in the outer ring 8. These bores open onto the groove 7 and allow grease to be fed through them into the internal bearing space.

FIG. 7 shows the bearing 3 of FIG. 5 mounted in the housing 4 of the invention. The housing includes a first annular part 10 and a second annular part 11, which removably mate together to define the volume in which the bearing 3 is housed and held. The two parts 10 and 11 are substantially identical, except for the fact that one of them (11) is provided with a hole 12 for a grease nipple 13.

To mount the bearing 3 in the housing, an O-ring 14 is placed around the internal corner of the housing part 11 and the bearing 3 is placed in the part 11 to abut the O-ring 14.

A second O-ring 15 is placed to encircle the outer ring of the bearing 3 and is so located that it lies at the joint formed between the two parts 10 and 11 when they are offered to one another as illustrated in FIG. 7.

The two parts 10 and 11 are each provided with a lug 16 and a corresponding mating component 17 (which could also be a lug) and also outer members 18 on wings 19. When the two parts 10 and 11 are offered up to one another as aforesaid and are turned clockwise relative to each other, the members 18 come into line and the lugs 1 and components 17 interlock. Pressure needs to be applied during this turning movement so that the O-ring 14 is compressed. When this pressure is released, residual compression is provided by the O-ring 14 between the faces of the members 18 and the faces of the lugs and their mating components, and in this condition there is a small gap 21 (FIG. 8) in the design between the opposing faces of the annuli of the parts 10 and 11 to allow the moldings (parts 10 and 11) to be further pressed together during assembly and demounting.

The housing is then mounted by means of the rubber bushes 5, etc., which prevent unlocking of the assembly.

It will be appreciated that both the O-rings 14 and 15 serve to retain grease in the housing and both O-rings also serve to preload the assembly.

FIG. 9 shows a lead angle 20 of 15° which is an example of one feature incorporated in the housing design which provides a self-locating feature for the assembly of the housed bearing which requires no assembly jigging. On the other hand, the parts can be demounted to replace the bearing.

It will be appreciated that some of the views in the drawings only show the form of the housing according to the invention (omitting the bearing) so that the housing's shape is more easily understood.

Having described the invention, what is claimed is:

1. A housing for a ball or roller bearing, the housing comprising a first part and a second part which removably mate together to define a volume in which the bearing is housed and held, an annular seal around the bearing and between the bearing and the joint between the two parts of the housing; and an annular seal for location between an outer ring of the bearing and one inner lateral face of one of the parts.

2. The housing according to claim 1, wherein said two parts are of similar configuration, except for one part having a grease nipple hole and one part having a portion radially overlapping the other part.

3. The housing according to claim 1, wherein the two parts are molded.

4. The housing according to claim 3, wherein the two parts are molded from carbon fiber-reinforced resin.

5. The housing according to claim 1, wherein each part has a substantially annular main section of basic L-section and wherein each is provided with cooperating lug means for mating engagement when the two parts are offered to one another and when one of the parts is rotated relatively to the other part, causing the two parts to interlock.

6. The housing according to claim 1, wherein the first part of the housing is provided with a first member and the second part of the housing is provided with a second member for mounting the housing on something else, the first and second members being adjacent when the first and second parts of the housing are mated together such that mounting of the housing holds the first and second members together and prevents relative rotation of the first and second parts of the housing.

7. A housed antifriction bearing comprising:
   an inner race;
   an outer race;
   rolling elements within an annular space between the inner race and outer race; and
   a housing having a first part and a second part which removable mate together to define a volume in which the outer race is housed and held, an annular seal around the bearing and between the bearing and the joint between the two parts of the housing; and an annular seal for location between an outer ring of the bearing and one inner lateral face of one of the parts.

8. The housed antifriction bearing according to claim 7, wherein said two parts are of similar configuration, except for one part having a grease nipple hole and one part having a portion radially overlapping the other part.

9. The housed antifriction bearing according to claim 7, wherein each part has a substantially annular main section of basic L-section and wherein each is provided with cooperating lug means for mating engagement when the two parts are offered to one another and when one of the parts is rotated relatively to the other part, causing the two parts to interlock.

10. The housed antifriction bearing according to claim 7, wherein the first part of the housing is provided with a first member and the second part of the housing is provided with a second member for mounting the housing on something else, the first and second members being adjacent when the first and second parts of the housing are mated together such that mounting of the housing holds the first and second members together and prevents relative rotation of the first and second parts of the housing.

11. The housed antifriction bearing according to claim 7, wherein the two parts are molded.

12. The housed antifriction bearing according to claim 11, wherein the two parts are molded from carbon fiber-reinforced resin.

* * * * *